(12) United States Patent
Yoneyama et al.

(10) Patent No.: US 6,840,624 B2
(45) Date of Patent: Jan. 11, 2005

(54) POLARIZED BEAM SPLITTER AND PROJECTION-TYPE IMAGE DISPLAY USING IT

(75) Inventors: Kazuya Yoneyama, Utsunomiya (JP); Kimiaki Nakazawa, Kitakatsushika-gun (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/626,655

(22) Filed: Jul. 25, 2003

(65) Prior Publication Data

US 2004/0150796 A1 Aug. 5, 2004

(30) Foreign Application Priority Data

Sep. 18, 2002 (JP) ........................................ 2002-272002

(51) Int. Cl.[7] ........................ G03B 21/14; G03B 21/00; G03B 21/28; G03B 27/28; G03B 5/30
(52) U.S. Cl. .............................. 353/20; 353/33; 353/81; 359/496; 359/500
(58) Field of Search .............................. 353/81, 33, 20; 359/490–496, 500, 501, 502

(56) References Cited

U.S. PATENT DOCUMENTS

| | | | | |
|---|---|---|---|---|
| 5,418,769 A | * | 5/1995 | Inoue | ................... 369/112.28 |
| 5,727,860 A | * | 3/1998 | Broer et al. | ................... 353/20 |
| 6,010,221 A | * | 1/2000 | Maki et al. | ................... 353/33 |
| 6,672,721 B2 | * | 1/2004 | Aastuen et al. | ................ 353/31 |
| 6,685,322 B2 | * | 2/2004 | Sawamura et al. | ........... 353/33 |
| 2002/0027619 A1 | | 3/2002 | Robinson et al. | |

* cited by examiner

Primary Examiner—Judy Nguyen
Assistant Examiner—Andrew Sever
(74) Attorney, Agent, or Firm—Arnold International; Jon W. Henry; Bruce Y. Arnold (57) ABSTRACT

A polarized beam splitter includes an inclined intermediate layer between two glass prisms. The intermediate layer includes an adhesive layer and a polarized light separating membrane. The intermediate layer may be wedge-shaped in order to compensate for or to cancel astigmatism of light transmitted by the polarized beam splitter caused by the inclination of the intermediate layer. The polarized beam splitter may also be formed with the refractive indexes of the glass and the adhesive of the adhesive layer chosen to reduce astigmatism. Embodiments of three-color projection image display devices that use the polarized beam splitter are also disclosed. The three-color projection image display devices may use one or three polarized beam splitters with a Philips prism or use two polarized beam splitters with a COLORQUAD.

6 Claims, 10 Drawing Sheets

POLARIZED BEAM SPLITTER AND PROJECTION-TYPE IMAGE DISPLAY USING IT

BACKGROUND OF THE INVENTION

Recently, reflective image display elements collectively called LCOS (Liquid Crystal on Silicon) have become of great interest as image display elements for projection image display devices. Two of the characteristics of an LCOS that are advantageous for such devices are high aperture efficiency compared to transmissive image display elements, which helps achieve bright images, and high resolution for the size of the LCOS. The LCOS controls the polarization direction of the light that it reflects in order to turn itself ON and OFF in use with a polarization sensitive beam splitter (hereinafter termed a polarized beam splitter or PBS). The PBS is generally provided in the optical path between an image display element and a projection lens.

A PBS used in a projection image display device is generally formed of two isosceles right triangular prisms with their hypotenuse surfaces bonded together (see, for example, Japanese Laid-Open Patent Application 2002-040367). At least one of the optical surfaces has a polarized light separating membrane that transmits light polarized in one direction and reflects light polarized in the other direction in order to separate and/or combine light beams of different polarization based on the polarization direction of light incident onto the PBS. Hereinafter, the polarized light separating membrane and adhesive layers that bond the membrane to the optical surfaces are collectively termed an intermediate layer.

Figure 7:
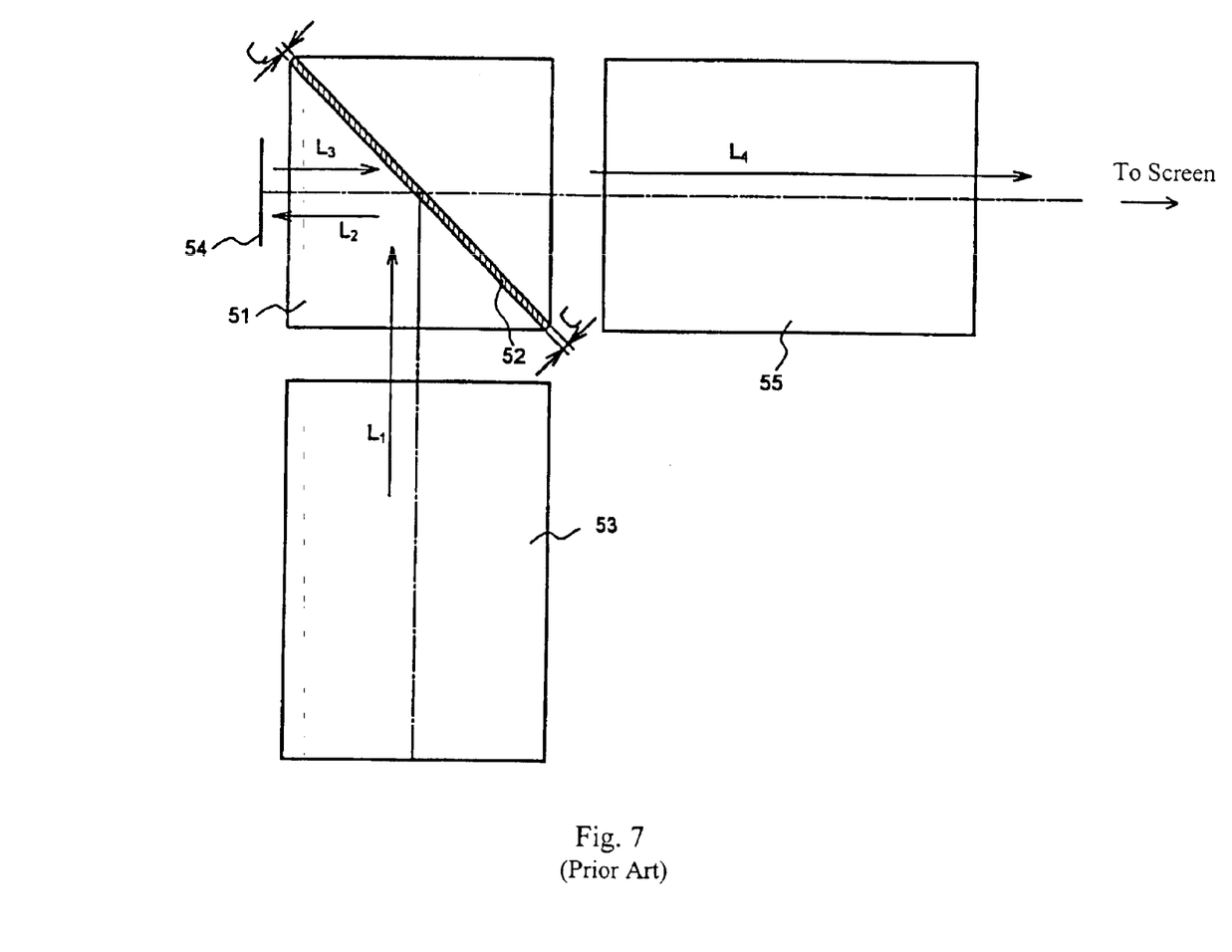
FIG. 7 shows a schematic cross-sectional view of projection image display device that includes a prior art PBS or a PBS that satisfies Conditions (2), (3), and (4) of the present invention.

FIG. 7 shows a schematic cross-sectional view of a prior art projection image display device that includes a PBS as described above. Light $L_1$ that is polarized in one direction (s-polarized in this example) is emitted from an illumination optical system 53, enters a PBS 51 and is reflected toward the LCOS 54 as Light $L_2$ by an intermediate layer 52 that is inclined forty-five degrees relative to the direction of travel of the light $L_1$. The reflected light $L_3$ is p-polarized, enters the PBS 51, and is transmitted through the intermediate layer 52 so as to project an image onto a screen (not shown) via a projection lens 55 as light $L_4$. In order to obtain color images using a projection image display device provided with less than three image display elements as shown in FIG. 7, a time-sharing color separating system (not shown) would be required to be used in the illumination optical system.

FIG. 7 shows the intermediate layer 52 enlarged relative to the other optical elements in order to assist in the explanation of the operation of the PBS 51. With production errors neglected, the hypotenuse surfaces of two isosceles right triangular prisms are bonded so as to be parallel to each other at the intermediate layer 52. Thus, the intermediate layer 52 has a uniform thickness C at every point.

In projection image display devices provided with LCOSs, it is important to eliminate the influence of birefringence of optical components as much as possible in order to achieve higher contrast in projected images. Furthermore, it is desirable that the body of the PBS have a larger refractive index for better polarized light separation by the polarized light separating membrane over a wide range of wavelengths. Prism glass materials that are currently in wide use and that meet these requirements often have a refractive index of 1.8 or larger.

On the other hand, adhesives having a refractive index of approximately 1.5 are in frequent use. Therefore, the prisms and the adhesive part of the intermediate layer forming the PBS are optically discontinuous. In general, an optically discontinuous surface that is oriented at an angle such that its surface normal is not aligned with an optical path, specifically in FIG. 7 an angle of forty-five degrees, causes astigmatism in an image produced from a light beam that has been transmitted through the optically discontinuous surfaces. Thus, the optically discontinuous surface 52 oriented at an angle of 45° in FIG. 7 to the transmitted light beam $L_4$ causes astigmatism in the projected images.

As described above, one of the advantageous characteristics of LCOSs is that of high resolution. With recent advanced techniques, LCOSs can have a pixel pitch of about ten microns. With such high resolution of LCOSs, the optical system following the LCOSs, such as a projection lens, must have improved imaging performance in the projection image display device in order to fully use this high resolution. The PBS described above is conventional and the astigmatism introduced by it was not a problem with the resolution of prior art LCOSs. However, that astigmatism is not a negligible factor in reducing resolution of projected images when LCOSs have a pixel pitch of about ten microns. In order to take full advantage of recently developed high resolution LCOSs, a PBS in which astigmatism can be more favorably corrected is desired.

BRIEF SUMMARY OF THE INVENTION

The present invention relates to polarized beam splitters in which astigmatism caused by an inclined intermediate layer therein can be favorably corrected. Also, the present invention relates to a projection image display device that achieves projected images with high resolution that is consistent with recently developed, high resolution LCOSs by using such a polarized beam splitter.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

A general description of the preferred embodiments of the PBSs (polarization sensitive beam splitters) of the present invention and projection image display devices using such PBSs will first be described with reference to FIG. 1 that shows a schematic cross-sectional view of a projection image display device of Embodiment 1. The projection image display device includes a light source (not shown), an illumination optical system 3, a PBS 1 having a wedge-shaped intermediate layer 2, an LCOS 4, and a projection lens 5. The illumination light from the illumination optical system 3 illuminates the LCOS 4 and the reflected light carrying image information from the LCOS 4 is projected onto a screen (not shown) in an enlarged size via the projection lens 5.

Figure 1:
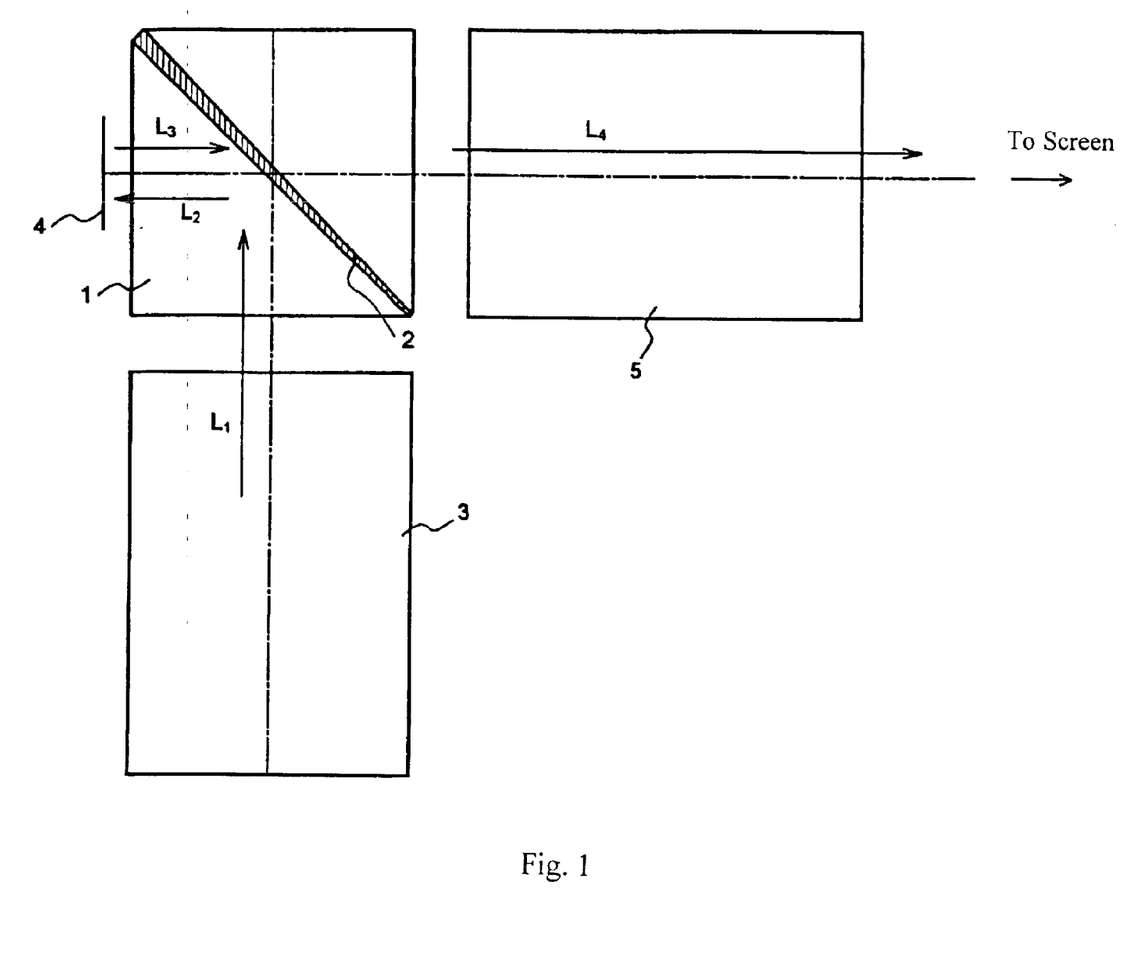
FIG. 1 shows a schematic cross-sectional view of a projection image display device of Embodiment 1.
Figure 2:
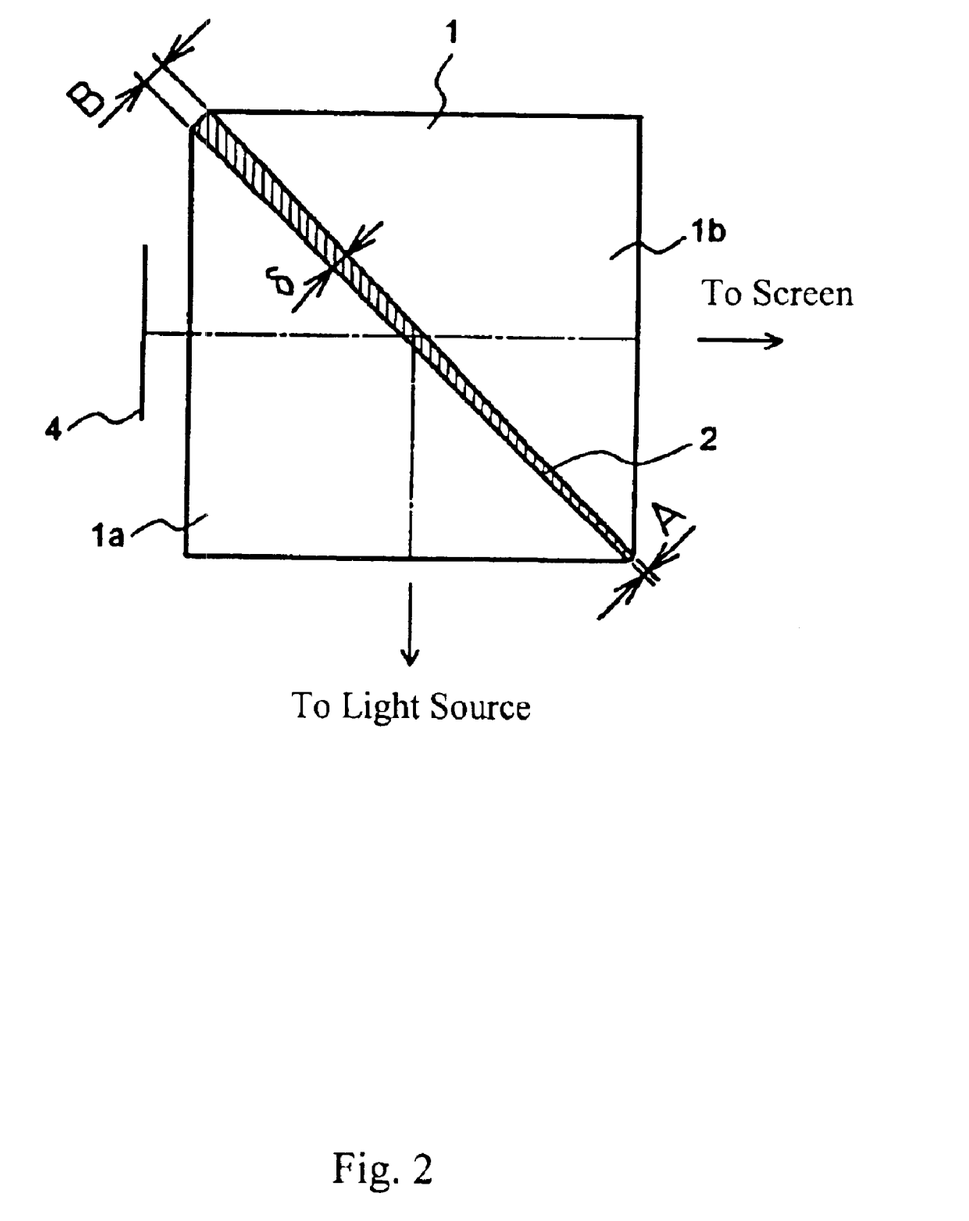
FIG. 2 shows an enlarged view of the PBS shown in FIG. 1.

FIG. 2 shows an enlarged view of the PBS 1 shown in FIG. 1. The PBS 1 includes two isosceles right triangular prisms 1a and 1b. The hypotenuse surfaces of the prisms 1a and 1b are bonded together via an adhesive layer. At least one of the hypotenuse surfaces of the prisms 1a and 1b has a polarization sensitive light separating membrane that transmits light polarized in one direction and reflects light polarized in the other direction in order to separate and/or merge them depending upon the polarization direction of incidental light to the PBS 1. Hereafter, the polarized light separating membrane and adhesive layer are collectively termed an intermediate layer 2.

The PBS 1 is oriented in a manner such that the intermediate layer 2 is inclined relative to the direction of incident light from the LCOS 4. There is a difference in refractive indexes between the glass material forming the prisms 1a and 1b and the adhesive forming the adhesive layer. In general, such optically discontinuous surfaces cause astigmatism when placed in an optical path at a specified angle that is not orthogonal to the light path. However, as shown in FIGS. 1 and 2, the intermediate layer 2 is wedge-shaped with the thicker part of the wedge positioned farther from a first surface of the prism on which light is initially incident than is the thinner part of the wedge so that the thicker part of the wedge-shaped intermediate layer is located nearer the incident surface of light from the LCOS 4 than is the thinner part of the wedge-shaped intermediate layer. With this arrangement, transmission of incident light through the intermediate layer 2 serves to compensate for and optimally substantially cancel astigmatism caused by the inclination of the intermediate layer 2.

As shown in FIG. 2, the hypotenuse surfaces of the prisms 1a and 1b and form an angle δ relative to each other. Assuming that the intermediate layer 2 has a thickness B at its end near the LCOS 4 and a thickness A at its end away from the LCOS 4, the wedge shape of the intermediate layer 2 results in satisfying the inequality A<B. The angle δ is appropriately determined depending on the inclination of the intermediate layer 2 relative to the incident light and the average thickness of the intermediate layer 2 (for example, the thickness along the optical axis). The intermediate layers of each of the PBSs of FIGS. 1, 2, and 4 to 6 are shown enlarged in order to clarify the wedge-shaped construction of the intermediate layer.

In the prior art, the hypotenuse surfaces of the isosceles right triangular prisms are bonded together so as to be parallel to each other. In contrast, in the present invention, the hypotenuse surfaces are intentionally bonded so as not to be parallel to each other and instead form a wedge-shaped intermediate layer. This results in a PBS 1 as shown for example in FIG. 1, in which astigmatism is favorably corrected and thus which can be used to provide a projection-type image display having excellent optical performance.

The present invention will now be described with further reference to the figures for PBS embodiments that variously satisfy Conditions (1)–(4) as discussed below.

PBS Embodiment that Satisfies Condition (1)

With reference to FIGS. 1 and 2, the astigmatism correction effect of the wedge-shaped intermediate layer 2 is particularly favorable when the following Condition (1) is satisfied:

$$|Np-Nc|>0.2 \qquad \text{Condition (1)}$$

where

Np is the refractive index of the material of the two prisms forming the PBS 1, and Nc is the refractive index of the adhesive material that forms the intermediate layer 2.

In other words, the wedge-shaped intermediate layer 2 has significant effect on astigmatism when there is a specified difference in refractive indexes between the two prisms and the adhesive layer. In this case, the intermediate layer 2 is an optically discontinuous surface. For example, the wedge-shaped intermediate layer 2 of this embodiment is effective where the glass material of the prisms has a refractive index of 1.8 or larger and the adhesive has a refractive index of approximately 1.5, as in a conventional PBS.

Figure 3:
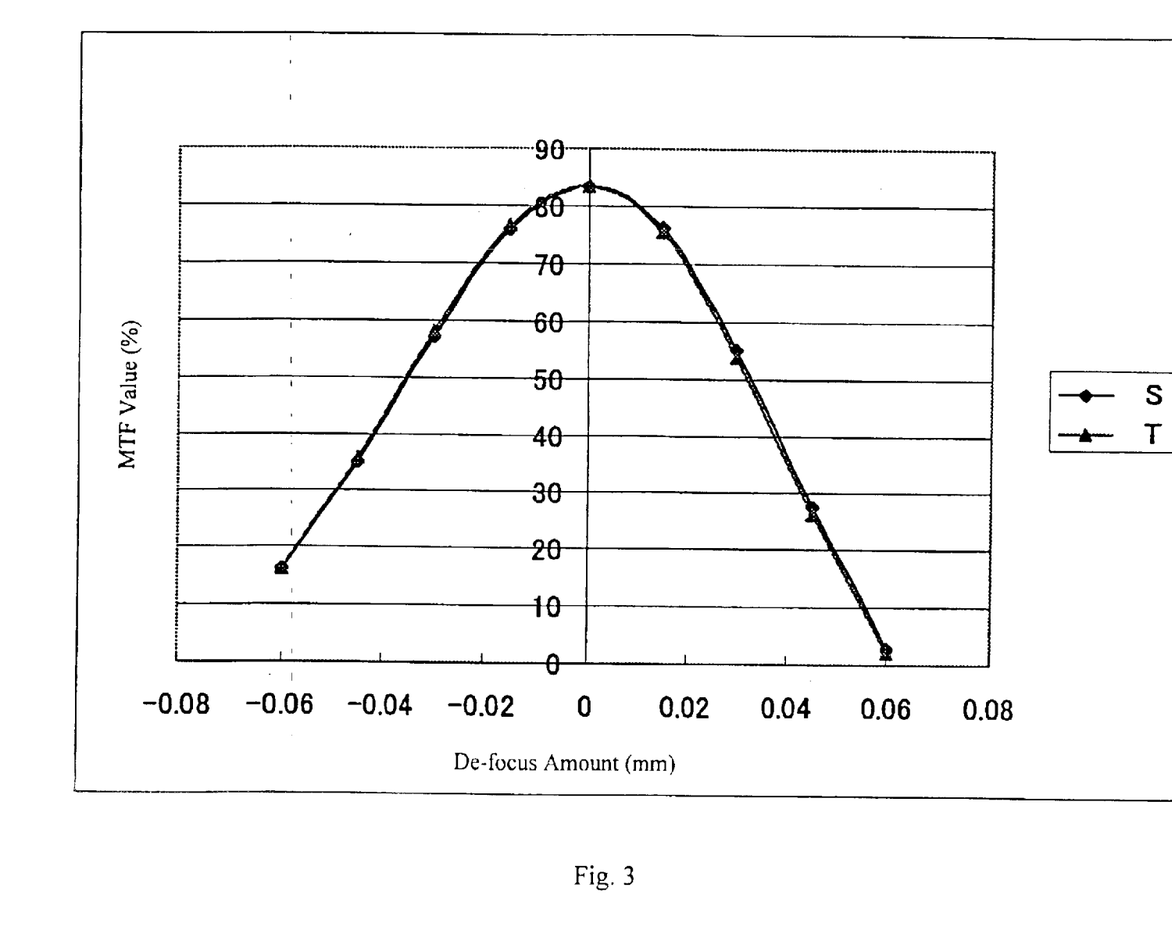
FIG. 3 is a graphical representation that shows MTF values of a PBS that satisfies Condition (1)
Figure 8:
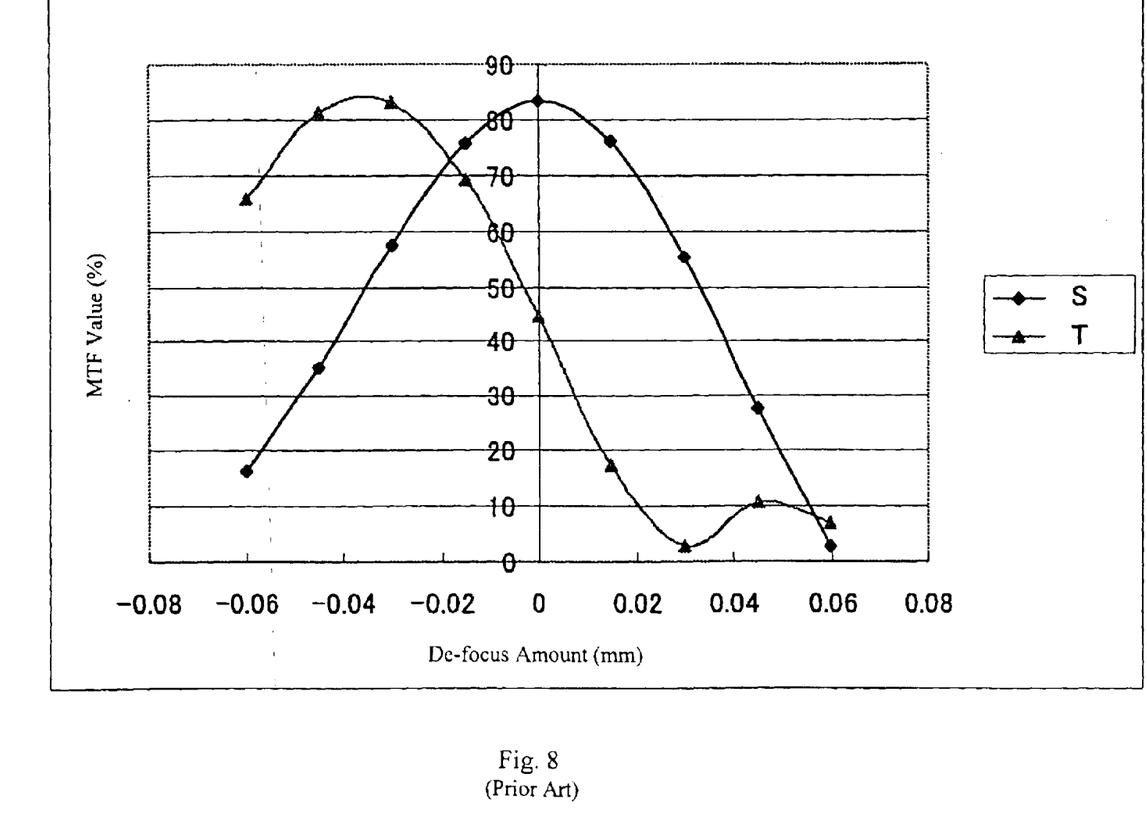
FIG. 8 is a graphical representation that shows the MTF values of a prior art PBS.

FIG. 3 is a graphical representation that shows MTF (Modulation Transfer Function) values of a PBS that satisfies Condition (1). FIG. 8 is a graphical representation that shows the MTF values of a prior art PBS. FIG. 3 and prior art FIG. 8 illustrate the astigmatism correction effect of this embodiment by showing the corrected and uncorrected MTF's, respectively. FIG. 3 shows MTF values of a PBS according to this PBS embodiment in which the intermediate layer 2 is wedge-shaped and is inclined approximately forty-five degrees relative to the incident light from the LCOS 4. The hypotenuse surface of the prism 1a is inclined forty-five degrees relative to the incident light and the hypotenuse surface of the prism 1b is inclined by 1.02 minutes, which equals the angle δ, relative to the hypotenuse surface of the prism 1a. FIG. 8 shows MTF values of a PBS according to the prior art shown in FIG. 7 in which the two prisms that form a PBS 51 are arranged with their hypotenuse surfaces parallel to each other and an intermediate layer 52 that is inclined forty-five degrees relative to the incident light has a uniform thickness. Other features of sagittal S image planes.

In prior art FIG. 7, the intermediate layer 52 that is inclined forty-five degrees relative to the incident light causes astigmatism near the optical axis. On the other hand, the astigmatism observed in FIG. 8 is highly compensated, in fact, nearly canceled, and the astigmatism near the optical axis is favorably corrected in the PBS embodiment shown in FIG. 3

The wedge-shaped intermediate layer 2 can be produced by adjusting the thicknesses of the polarized light separating membrane and/or the adhesive layer. For example, one way to adjust the thickness of the adhesive layer is to apply an adhesive mixed with hard beads having a specified diameter to part of the perimeter of the bonding surface of one prism, apply an adhesive mixed with beads made of the same material, but having a smaller diameter, to part of the perimeter of the bonding surface of the other prism that is nearly symmetrical to the part of the one prism, bonding the two prisms together, and injecting an adhesive without beads in the wedge-shaped inner space.

As an alternative to embodiments that satisfy Condition (1), as set forth above, a PBS embodiment may not satisfy Condition (1) but satisfy Conditions (2), (3), and (4), as set forth below.

PBS Embodiment that Satisfies Conditions (2), (3) and (4)

With a PBS that includes two prisms bonded together via an adhesive layer with a polarized light separating membrane formed on at least one of the surfaces of the two prisms that face each other via the adhesive layer, the difference in refractive indexes between the glass material of the two prisms forming the PBS and the adhesive forming the adhesive layer may be relatively small in some cases so that, for example, Condition (1) explained above is not satisfied. Astigmatism does not occur where both refractive indices are equal and an optically discontinuous surface is absent even though the adhesive layer and the polarized light separating membrane are placed in the optical path at an angle that is not orthogonal thereto. Therefore, the problem of astigmatism can be at least partially solved by satisfying the following Conditions (2)–(4) that generally relate to the adhesive bonding the glass prisms having a refractive index of about 1.8 or larger:

| | |
|---|---|
| $Nc \geq 1.75$ | Condition (2) |
| $Np \geq 1.85$ | Condition (3) |
| $|Np-Nc| < 0.2$ | Condition (4) | where

Nc is the refractive index of the adhesive, and

Np is the refractive index of the glass.

When Conditions (2)–(4) are satisfied, practically no astigmatism occurs. That is, satisfying Conditions (2)–(4) not only compensates for astigmatism caused by the inclination of the intermediate layer but also essentially cancels it. Thus, it may not be necessary to form an intermediate layer including an adhesive layer and a polarized light separating membrane in a wedge shape, which may reduce production costs. In addition, such a PBS can be used to provide a projection-type image display having excellent optical performance.

Figure 9:
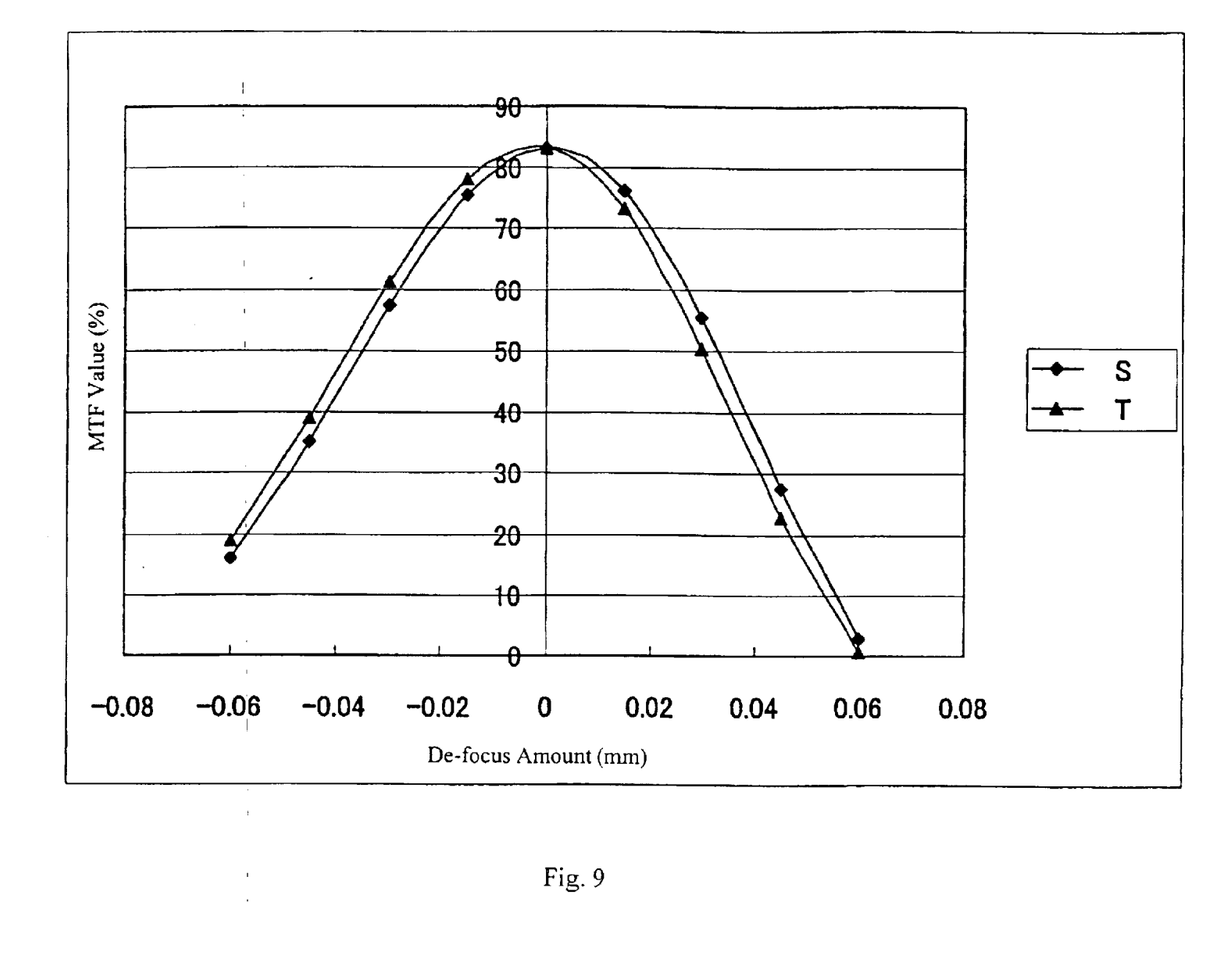
FIG. 9 is a graphical representation that shows the MTF values of a PBS that satisfies Conditions (2), (3), and (4) of the present invention.

FIG. 9 is a graphical representation of MTF (Modulation Transfer Function) values that illustrate the astigmatism correction effect of this PBS embodiment. The PBS of this PBS embodiment includes two prisms with facing surfaces that are parallel or nearly parallel to each other and the intermediate layer is inclined by forty-five degrees relative to the incident light from the LCOS and is uniform in thickness. Because the intermediate layer is not required to be wedge-shaped, FIG. 7 also represents the construction of a PBS according to this embodiment. The adhesive has a refractive index Nc of 1.75. The glass has a refractive index Np of 1.87. Other features of this PBS embodiment are the same as those of the previously described PBS embodiments. FIG. 9 shows values on the tangential T and sagittal S image planes. It is obvious from FIG. 9 that this embodiment substantially cancels astigmatism observed in FIG. 8 and astigmatism near the optical axis is satisfactorily corrected to the extent that it is practically negligible.

PBS Embodiment that Satisfies Conditions (1), (2), (3) and (4)

Astigmatism can be further satisfactorily corrected by, in addition to satisfying Conditions (2), (3) and (4) above, by making the intermediate layer inclined relative to the incidental light to be wedge-shaped, as described above, with the thick part of the intermediate layer being near the incident surface from the LCOS of the prisms forming the PBS and the thin part being farther away from the incident surface in order to substantially cancel the astigmatism caused by the inclination. As described above, FIG. 9 is a graphical representation of MTF (Modulation Transfer Function) values that illustrate the astigmatism correction effect of a PBS embodiment that does not include a wedge-shaped intermediate layer.

Figure 10:
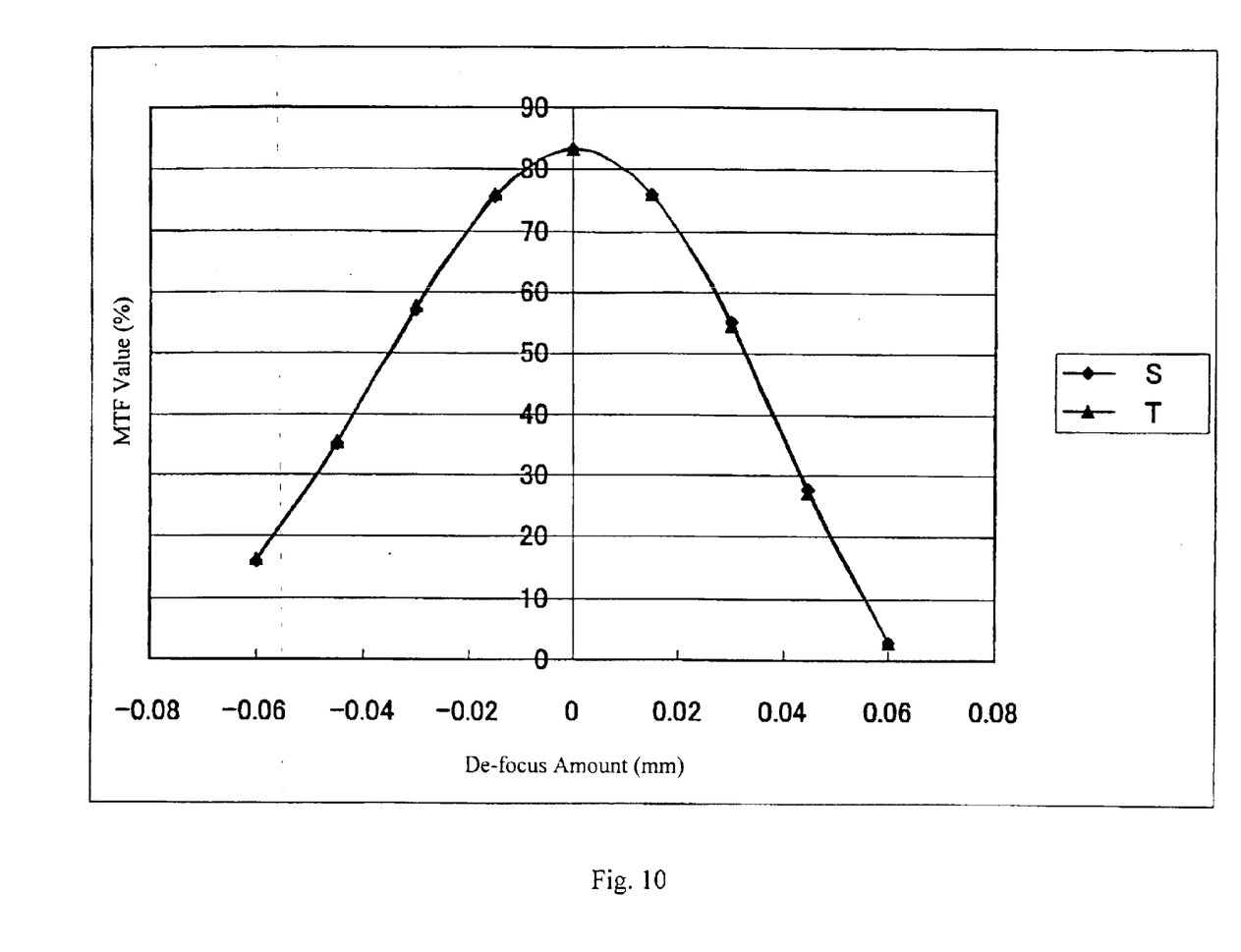
FIG. 10 is a graphical representation that shows the MTF values of a PBS that satisfies Conditions (1), (2), (3), and (4) of the present invention.

In the present embodiment, the hypotenuse surface of one prism is inclined by forty-five degrees relative to the incident light and the hypotenuse surface of the other prism is inclined by approximately 0.54 minutes, which equals the angle δ, relative to the hypotenuse surface of the one prism. Other features of this PBS embodiment are the same as the previously described PBS embodiments. FIG. 10 shows values in the tangential T and sagittal S image planes of this PBS embodiment. It is obvious from FIG. 10 that the wedge-shaped intermediate layer reduces astigmatism shown in FIG. 9 such that the astigmatism near the optical axis is favorably corrected.

Four preferred embodiments of projection image display devices using PBSs of the present invention including a wedge-shaped intermediate layer will now be described with further reference to the drawings.

Embodiment 1

FIG. 1 shows a schematic cross-sectional view of a projection image display device of Embodiment 1. FIG. 2 shows an enlarged view of the PBS 1 shown in FIG. 1. The projection image display device includes a light source (not shown), an illumination optical system 3 including a time-sharing color separating system, a PBS 1 including a wedge-shaped intermediate layer 2 according to the present invention, an LCOS 4 as an image display element, and a projection lens 5. The lower surface of the intermediate layer 2 is inclined forty-five degrees relative to the incident light, and its wedge shape is such that the thick part of the intermediate layer 2 is located near the incident surface of light from the LCOS 4 and the thin part is located away from it. The PBS 1 satisfies Condition (1) above in which Np is the refractive index of the material of the two prisms forming the PBS 1 and Nc is the refractive index of the adhesive forming the adhesive layer of the intermediate layer 2.

Light $L_1$ is emitted from a light source (not shown) through an illumination optical system 3, and enters the PBS 1. The s-polarized components $L_2$ of this light are reflected toward the LCOS 4 by the intermediate layer 2. When the LCOS 4 is ON, it transforms the s-polarized light into p-polarized light and reflects it. The reflected light $L_3$ which is p-polarized, enters the PBS 1 and is transmitted through the intermediate layer 2 so as to project an image onto a screen (not shown) via a projection lens 5. In order to obtain color images using a projection image display device provided with less than three image display elements as shown in FIG. 7, a time-sharing color separating system (not shown) would be required to be used in the illumination optical system. The time-sharing color separating system for obtaining color images in Embodiment 1 can be a color wheel, for example, a COLORSWITCH (registered trademark of Color Link, Inc., US).

As shown in FIGS. 1 and 2, in Embodiment 1, the PBS is positioned so that the intermediate layer 2 is inclined relative to the incident light from the LCOS 4. However, the intermediate layer 2 has a specified wedge shape so that astigmatism is satisfactorily corrected. Hence, the projection-type image display has excellent optical performance.

An additional image display element may be used in Embodiment 1. The additional image display element can be illuminated by the illumination light transmitted through the PBS 1 and the projection light reflected from the additional image display element further reflected by the intermediate layer 2 and merged with the light from the other image display element. In this way, the illumination light is used more efficiently.

Embodiment 2

Figure 4:
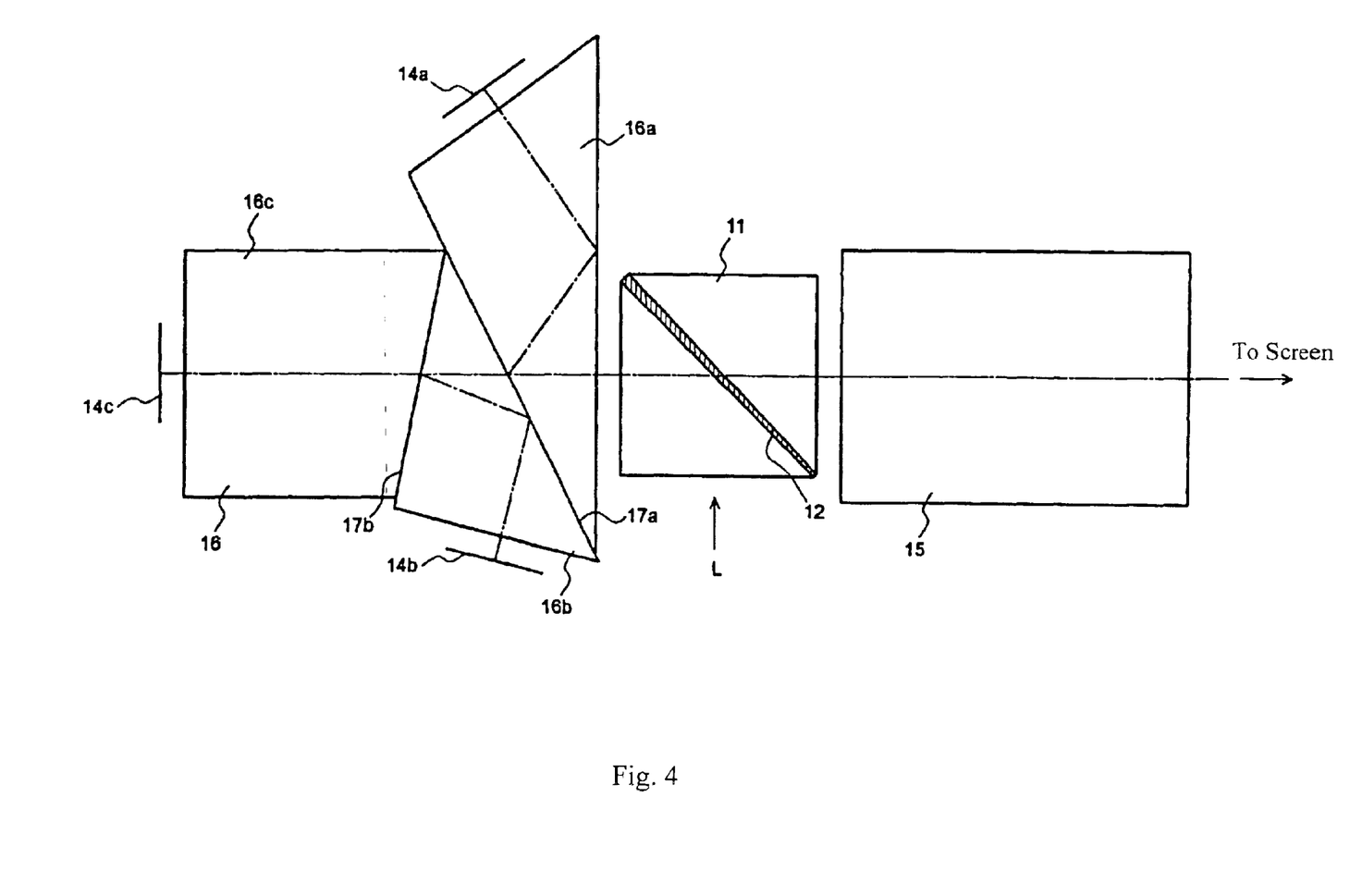
FIG. 4 shows a schematic cross-sectional view of a projection image display device of Embodiment 2.

FIG. 4 shows a schematic cross-sectional view of a projection image display device of Embodiment 2. The projection image display device includes a light source and an illumination optical system (not shown), a Philips prism 16, which is not polarization sensitive, as a color separating and combining device, a PBS 11 including a wedge-shaped intermediate layer 12 according to the present invention, LCOSs 14a, 14b, and 14c as image display elements, and a projection lens 15.

PBS 11 is nearly the same as PBS 1 of Embodiment 1 and, therefore, a detailed explanation of its structure is omitted here. The intermediate layer 12 is inclined by approximately forty-five degrees relative to the incident light. The thick part of the wedge shape is located near the incident surface of light from the LCOSs 14a, 14b, and 14c and the thin part is located away from the incident surface. The PBS 11 satisfies Condition (1) in which Np is the refractive index of the material of the two prisms forming the PBS 11 and Nc is the refractive index of the adhesive forming the adhesive layer of the intermediate layer 12.

The Philips prism 16 includes first to third prisms 16a, 16b, and 16c, respectively. The first prism 16a has a first color light exit surface that faces the first color light LCOS 14a. The second prism 16b has a second color light exit surface that faces the second color light LCOS 14b. The third prism 16c has a third color light exit surface that faces the third color light LCOS 14c. The first to third color lights correspond to the primary colors, blue, red, and green, in any order. In Embodiment 2, if it is considered more important that the green light image be without astigmatism than the blue or red light images, the first color light may be green, the second may be blue, and the third may be red.

The first-prism 16a has a reflecting prism surface 17a at the boundary with the second prism 16b, on which a dichroic membrane that reflects the wavelength range including the first color light and transmits the wavelength ranges including the second and third color lights is formed. The second prism 16b has a reflecting prism surface 17b at the boundary with the third prism 16c, on which a dichroic membrane that reflects the wavelength range including the second color light and that transmits the other wavelength ranges among the color lights that enter the second prism 16b.

Light, designated by the arrow L and polarized in one direction (s-polarized in this Embodiment 2), is emitted from a light source (not shown) through an illumination optical system (not shown), enters the PBS 11 and is reflected toward the Philips prism by the polarized light separating membrane of the intermediate layer 12. The illumination light enters the first prism 16a of the Philips prism 16. Only the first color light is reflected by the reflecting prism surface 17a and the second and third color lights are transmitted through it. The first color light reflected by the reflecting prism surface 17a is totally reflected by the incident prism surface and exits from the first color light exit surface so as to illuminate the first color light LCOS 14a. On the other hand, for the second and third color lights that are transmitted through the reflecting prism surface 17a, the second color light is reflected by the reflecting prism surface 17b and the third color light is transmitted through it. The reflected second color light is totally reflected by the totally reflecting prism surface of the second prism 16b and exits from the second color light exit surface so as to illuminate the second color light LCOS 14b. The transmitted third color light is transmitted through the third prism 16c and exits from the third color light exit surface so as to illuminate the third color light LCOS 14c.

The first, second, and third color light LCOSs 14a, 14b, and 14c reflect light carrying image information corresponding to the respective colors as projected light. Following the color separation process in the reverse direction, the projection lights merge and re-enter the PBS 11. The LCOSs 14a, 14b, and 14c transform s-polarized light into p-polarized light and reflect it when they are ON. The p-polarized projected light beams are transmitted through the intermediate layer 12 of the PBS 11 so that full color enlarged images are projected on a screen (not shown) via the projection lens 15.

In Embodiment 2, the PBS 11 is arranged so that the intermediate layer 12 is inclined relative to the incident light from the Philips prism 16 and relative to the incident light from the LCOSs 14a, 14b, and 14c. However, the intermediate layer 2 has a specified wedge shape and, thus, astigmatism is satisfactorily corrected. Hence, the projection-type image display has excellent optical performance.

Embodiment 3

Figure 5:
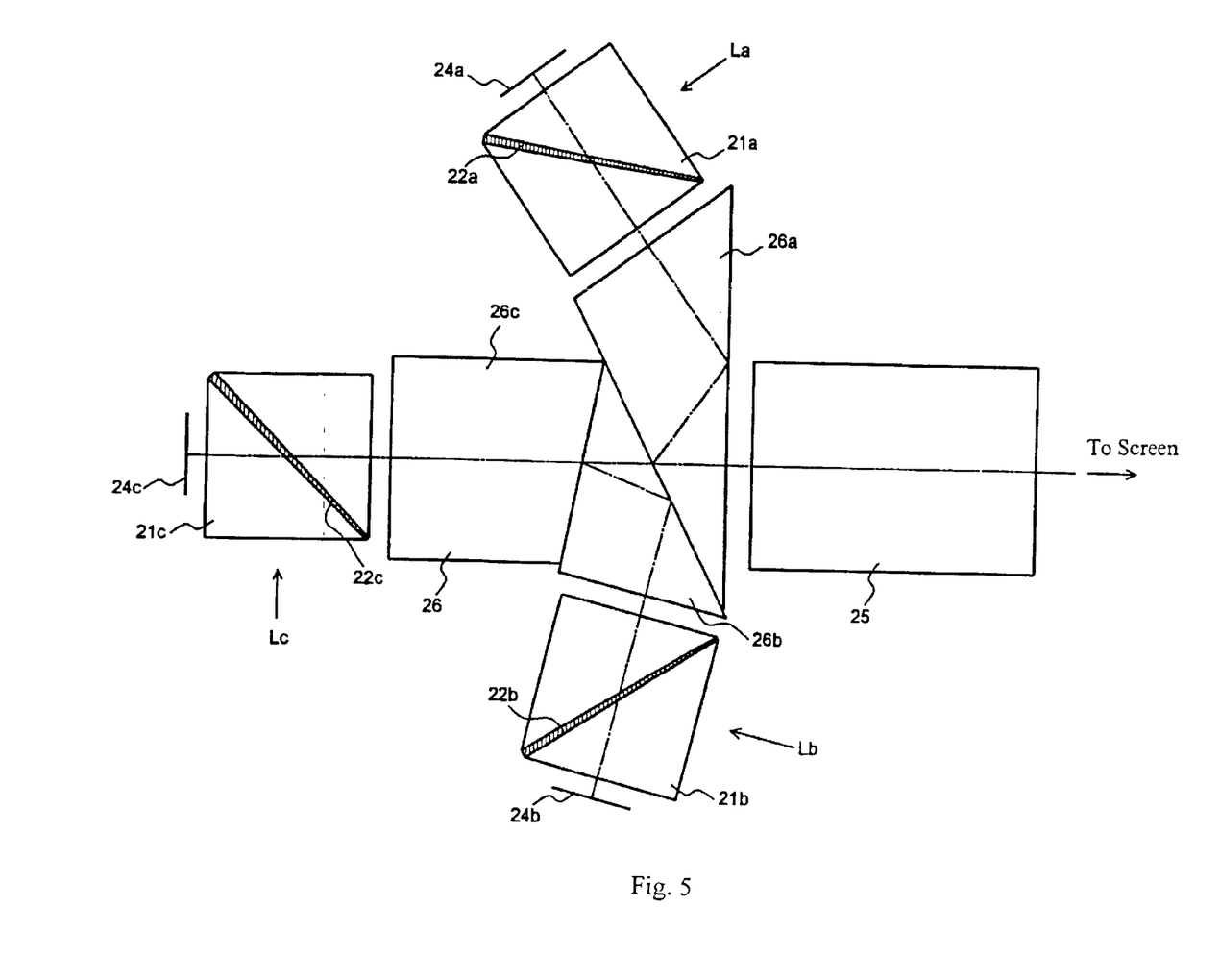
FIG. 5 shows a schematic cross-sectional view of a projection image display device of Embodiment 3.

FIG. 5 shows a schematic cross-sectional view of a projection image display device of Embodiment 3. The projection image display device includes a light source and an illumination optical system (not shown), a Philips prism 26, which is not polarization sensitive, as a color separating and combining device, PBSs 21a, 21b, and 21c including wedge-shaped intermediate layers 22a, 22b, and 22c, respectively, according to the present invention, LCOSs 24a, 24b, and 24c as image display elements, and a projection lens 25.

The PBSs 21a, 21b, and 21c are nearly the same as the PBS 1 of Embodiment 1, and therefore, detailed explanations of their construction is omitted here. The intermediate layers 22a, 22b, and 22c are inclined by approximately forty-five degrees relative to the incident light. The thick parts of the wedge shapes are located near the incident surfaces of light from the LCOSs 24a, 24b, and 24c and the thin parts are located away from the incident surfaces. The PBSs 21a, 21b, and 21c satisfy Condition (1) in which Np is the refractive index of the material of the two prisms forming each of the PBSs 21a, 21b, and 21c and Nc is the refractive index of the adhesive forming the adhesive layers of the intermediate layers 22a, 22b, and 22c.

The Philips prism 26 has nearly the same structure as the Philips prism 16 of Embodiment 2 and, therefore, a detailed explanation of its construction is omitted here. However, the Philips prism of this embodiment serves only as a color combining device.

In Embodiment 3, the PBSs 21a, 21b, and 21c for the first, second, and third colors, respectively, are provided between the first, second, and third color light LCOS 24a, 24b, and 24c, respectively, and the corresponding first, second, and third prisms 26a, 26b, and 26c, respectively, of the Philips prism 26.

Light, designated by the arrows La, Lb and Lc, and polarized in one direction (s-polarized in this Embodiment 3), is emitted from light sources (not shown) through illumination optical systems (not shown), enters the first, second, and third color light PBSs 21a, 21b, and 21c, and is reflected toward the corresponding first, second, and third color light LCOSs 24a, 24b, and 24c, respectively, by the polarized light separating membranes of the intermediate layers 22a, 22b, and 22c, respectively.

The first, second, and third color light LCOSs 24a, 24b, and 24c reflect light carrying image information corresponding to the respective colors, which re-enter the PBSs 21a, 21b, and 21c. The LCOSs 24a, 24b, and 24c transform s-polarized light into p-polarized light by reflecting light when they are ON. The reflected p-polarized light beams are transmitted through the intermediate layers 22a, 22b, and 22c of the PBSs 21a, 21b, and 21c and enter the first, second, and third prisms 26a, 26b, and 26c, respectively, of the Philips prism 26.

The Philips prism 26 combines the reflected light beams carrying image information corresponding to the respective different colors in a similar manner to the Philips prism 16 of Embodiment 2 by the reflected light beams following the color separation process in the reverse direction in order to combine the light beams. The combined light beams are used to project full color, enlarged images on a screen (not shown) via the projection lens 25.

In Embodiment 3, the PBSs 21a, 21b, and 21c are arranged so that the intermediate layers 22a, 22b, and 22c are inclined relative to the incident light from the LCOSs 24a, 24b, and 24c. However, the intermediate layers 22a, 22b, and 22c have a specified wedge shape so that astigmatism is satisfactorily corrected. Hence, the projection-type image display has excellent optical performance.

Both Embodiment 3 and Embodiment 2 described above include a Philips prism. However, Embodiment 2 uses only one PBS and, thus, is advantageous in reducing weight and costs of the projection image display device. On the other hand, Embodiment 3 has the PBSs provided closer to the LCOSs as compared to Embodiment 2, which reduces the optical path length along which the polarized light is transmitted through the glass. This reduces the chance of the optical system introducing substantial birefringence and, therefore, is advantageous to image quality.

Embodiment 4

Figure 6:
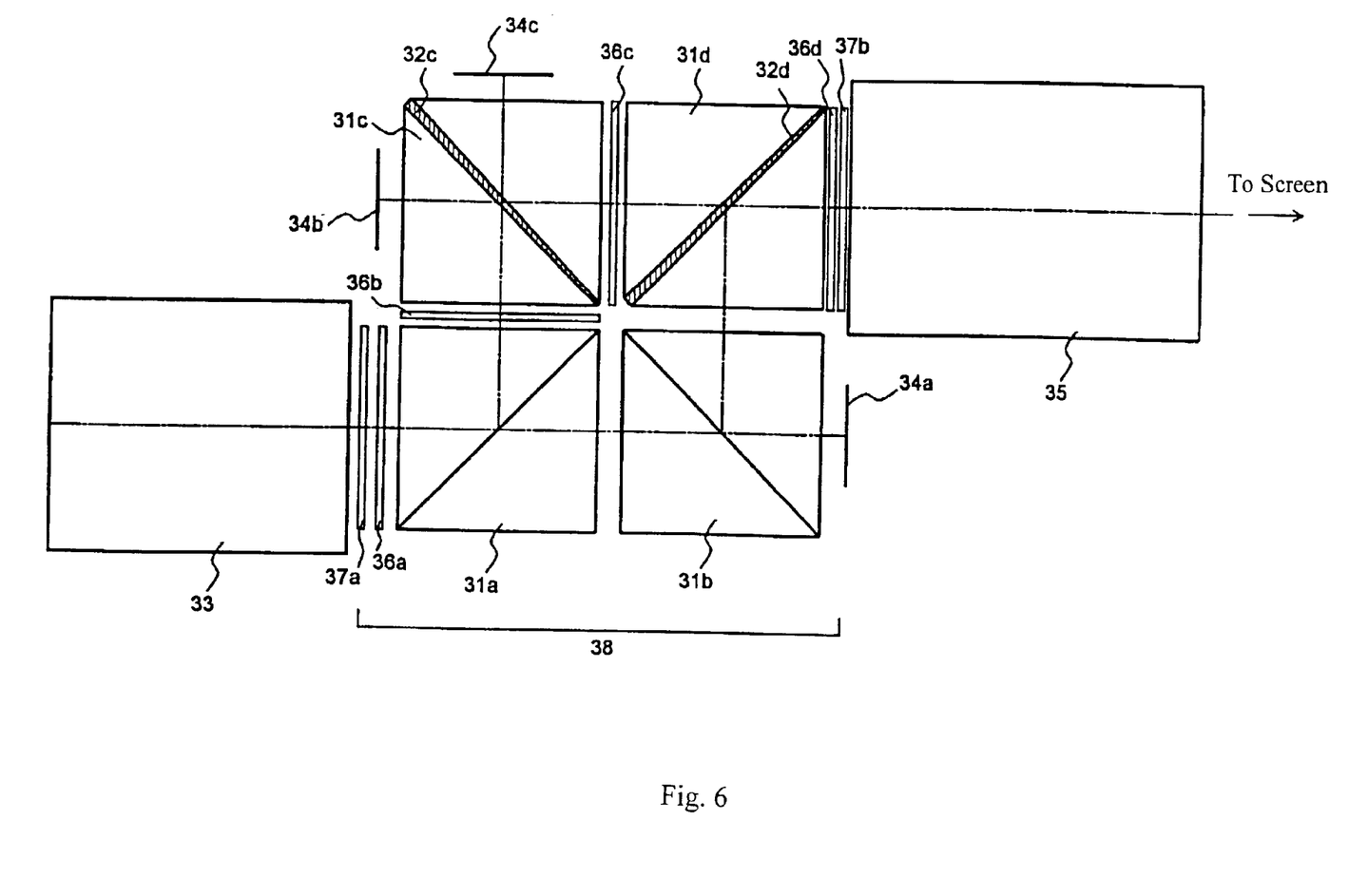
FIG. 6 shows a schematic cross-sectional view of a projection image display device of Embodiment 4.

FIG. 6 shows a schematic cross-sectional view of a projection image display device of Embodiment 4. The projection image display device of this embodiment includes a light source (not shown), an illumination optical system 33, a color separating and combining system that includes at least one polarized beam splitter that includes a wedge-shaped intermediate layer according to the present invention, LCOSs 34a, 34b, 34c as image display elements, and a projection lens 35. The color separating and combining system can be formed of, for example, a COLORQUAD (registered trademark of Color Link, Inc. US).

Light emitted from light sources (not shown) enters the COLORQUAD 38. After color separation by the COLORQUAD 38, the illumination light is transformed into projection light carrying image information corresponding to three respective colors at the LCOSs 34a, 34b, and 34c, which is followed by the merging of the colored light beams that then exit so as to project full-color, enlarged images onto a screen (not shown) via the projection lens 35. The COLORQUAD 38 includes PBSs 31c and 31d with their wedge-shaped intermediate layers 32c and 32d, respectively.

The PBSs 31c and 31d are nearly the same as the PBS 1 of Embodiment 1, and, therefore, detailed explanations of their construction are omitted here. The intermediate layers 32c and 32d are inclined by approximately forty-five degrees relative to the incident light from the LCOSs 34a, 34b, and 34c. The thick parts of the wedge shapes are located near the incident surfaces of light from the LCOSs 34a, 34b, and 34c and the thin parts are located away from the incident surfaces. The PBSs 31c and 31d satisfy Condition (1) in which Np is the refractive index of the material of the two prisms forming the PBSs 31c and 31d and Nc is the refractive index of the adhesive forming the adhesive layer of the intermediate layers 32c and 32d.

As shown in FIG. 6, more specifically, the COLORQUAD 38 includes first to fourth PBSs 31a, 31b, 31c, and 31d having the polarized light separating membranes arranged in an X-shape, the first to third LCOSs 34a, 34b, and 34c corresponding to the three primary colors, first to fourth specific wavelength polarizing elements 36a, 36b, 36c, and 36d, and first and second polarizing plates 37a and 37b. The first to third LCOSs 34a, 34b, and 34c correspond to the three primary colors, blue, red, and green, in any arbitrary order. In Embodiment 4, if it is considered more important that the green light image be without astigmatism than the blue or red light images, the first color light may be green, the second may be blue, and the third may be red.

The polarizing plate 37a is provided to further assure that uniformly s-polarized light of the illumination light reaches the beamsplitting elements of the COLORQUAD 38 and the polarizing plate 37b is provided in order to further assure that uniformly p-polarized light is projected to the projection lens 35, improving contrast in the projected images. The specific wavelength polarizing elements 36a, 36b, 36c, and 36d rotate the direction of polarization of light beams of specified color by a specified angle for transformation of s-polarization to p-polarization. The specific wavelength polarizing elements 36a and 36d transform the first color light beam from s-polarized light to p-polarized light, and the specific wavelength polarizing elements 36b and 36c transform the third color light beam from s-polarized light to p-polarized light.

With the structure described above, the first color light beam is transmitted through the PBSs 31a and 31b to illuminate the LCOS 34a that optically modulates the first color light beam. The second color light beam is reflected by the PBSs 31a and 31c to illuminate the LCOS 34b that optically modulates the second color light beam. The third color light beam is reflected by the PBS 31a and is then transmitted through the PBS 31c so as to illuminate the LCOS 34c that optically modulates the third color light beam. The projected light of the first color light beam is s-polarized in accordance with ON of the LCOS 34a and reflected by the PBSs 31b and 31d. The projected light of the second color light beam is p-polarized in accordance with ON of the LCOS 34b and is transmitted through the PBSs 31c and 31d. The projection light of the third color light beam is s-polarized in accordance with ON of the LCOS 34c, is reflected by the PBS 31c, converted to p-polarization by the specific wavelength polarizing element 36c, and is transmitted through the PBS 31d. These three colors merge and exit from the COLORQUAD 38.

In the projection image display device of FIG. 6, the PBSs 31c and 31d are arranged so that the intermediate layers 32c and 32d are inclined relative to the incident light from the LCOSs 34a, 34b, and 34c. However, the intermediate layers 32c and 32d have a specified wedge shape so that astigmatism is satisfactorily corrected. Hence, the projection-type image display has excellent optical performance.

In the projection image display device shown in FIG. 6, among the four PBSs forming the COLORQUAD 38, the PBSs 31c and 31d include wedge-shaped intermediate layers 32c and 32d according to the present invention. As described above, astigmatism occurs when an intermediate layer that includes a polarized light separating membrane and an adhesive layer is inclined relative to the incidental light. However, such astigmatism is not an inherent problem of the illuminating light. Thus, practically, sufficient optical performance can be obtained if the intermediate layers 32c and 32d that are in the optical path of the projection light carrying image information after the LCOSs 34a, 34b, and 34c have specified wedge shapes. More precisely, different projected light beams from the LCOSs are affected by astigmatism differently based on which surface of the two prisms forming the PBSs 31c and 31d has the polarized light separating membrane. However, it is necessary and sufficient that the two PBSs 31c and 31d include the wedge-shaped intermediate layers 32c and 32d in order to satisfactorily correct the astigmatism.

The invention being thus described, it will be obvious that the same may be varied in many ways. For example, the COLORQUAD of Embodiment 4 (shown in FIG. 6) is only an example of a color separating and combining system. The color separating and combining system may instead be formed of a prism integrated with a PBS in which a member serving as a polarized light separating membrane is provided, instead of using four separate PBSs. In addition, although the polarized light separating surface described above transmits p-polarized light and reflects s-polarized light, the polarized light separating surface may instead be made to transmit s-polarized light and to reflect p-polarized light. Additionally, the number of polarized beam splitters may be varied from those disclosed above. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A polarized beam splitter comprising:
    a first prism that includes a first surface and a second surface inclined with respect to said first surface;
    a second prism that includes a third surface that faces said second surface;
    an intermediate layer between said second surface and said third surface that includes an adhesive layer that bonds said first prism to said second prism and a polarized light separating membrane; and
   wherein the following conditions are satisfied:

$Nc \geq 1.75$ $Np \geq 1.85$ $|Np-Nc| > 0.2$ where
    Np is the refractive index of said first prism and said second prism, and
    Nc is the refractive index of the adhesive forming said adhesive layer.

2. The polarized beam splitter of claim 1, wherein the intermediate layer is wedge-shaped and the thicker part of the wedge is located farther from said first surface than is the thinner part of the wedge so that transmission of a light beam that is incident on said first surface and thereafter transits through the intermediate layer compensates for astigmatism of a light beam caused by the inclination of said second surface with respect to said first surface.

3. The polarized beam splitter of claim 2, wherein the transmission of the light beam through said intermediate layer substantially cancels astigmatism caused by the inclination of said second surface.

4. A projection image display device including the polarized beam splitter of claim 1.

5. A projection image display device including the polarized beam splitter of claim 2.

6. A projection image display device including the polarized beam splitter of claim 3.

* * * * *

UNITED STATES PATENT AND TRADEMARK OFFICE
CERTIFICATE OF CORRECTION

PATENT NO.    : 6,840,624 B2
DATED         : January 11, 2005
INVENTOR(S)   : Yoneyama et al.

It is certified that error appears in the above-identified patent and that said Letters Patent is hereby corrected as shown below:

Column 3,
Line 49, change "and form" to -- form --;

Column 4,
Line 50, before "sagittal" insert -- the two PBSs are assumed to be the same. Figs. 3 and 8 show values on the tangential T and --.

Signed and Sealed this

Tenth Day of May, 2005

JON W. DUDAS
*Director of the United States Patent and Trademark Office*